US006978317B2

(12) United States Patent
Anantha et al.

(10) Patent No.: US 6,978,317 B2
(45) Date of Patent: Dec. 20, 2005

(54) METHOD AND APPARATUS FOR A MOBILE DEVICE TO ADDRESS A PRIVATE HOME AGENT HAVING A PUBLIC ADDRESS AND A PRIVATE ADDRESS

(75) Inventors: Swaminathan Anantha, Round Lake, IL (US); Rajesh S. Pazhyannur, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 36 days.

(21) Appl. No.: 10/746,119

(22) Filed: Dec. 24, 2003

(65) Prior Publication Data

US 2005/0177647 A1    Aug. 11, 2005

(51) Int. Cl.[7] ............................................. G06F 13/00
(52) U.S. Cl. ..................................................... 709/249
(58) Field of Search ................................. 370/229, 230, 370/235, 254, 329, 338, 392, 395.5, 395.51, 370/395.52, 395.53; 709/222, 223, 226, 227, 709/229

(56) References Cited

U.S. PATENT DOCUMENTS

| | | | |
|---|---|---|---|
| 6,445,922 B1 | | 9/2002 | Hiller et al. |
| 6,560,217 B1 | | 5/2003 | Peirce, Jr. et al. |
| 6,738,362 B1 | * | 5/2004 | Xu et al. ................... 370/329 |
| 6,856,624 B2 | * | 2/2005 | Magret ........................ 370/392 |

OTHER PUBLICATIONS

Solomon, James D., *Mobile IP, The Internet Unplugged*. 1996-1997, pp. 185-187. Copyright © 1996-1997.
Levkowetz, H. and S. Vaarala. "*Mobile IP NAT/NAPT Traversal Using UDP Tunnelling*". Nov. 4, 2002. 13 pages. Copyright © 2002 The Internet Society.
Vaarala, S. "*Mobile IPv4 Traversal Across IPsec-based VPN Gateways*". Apr. 9, 2003. 15 pages. Copyright © 2003 The Internet Society.

* cited by examiner

Primary Examiner—Robert B. Harrell

(57) ABSTRACT

A method and apparatus for a mobile device (104) to register with a private home agent (106), the method comprising the steps: generating (304) and sending (306) a registration request (700) addressed in the public network (110) to a public address of the private home agent, the request (700) adapted to initiate registration of the mobile device with the private home agent. The mobile device is located within a public network, but belongs to a private network (102) and has a private address. The private home agent is located in the private network and has both a private address and a public address. The request also indicates that the mobile device is in the public network. In preferred form, the request includes an extension (704) that provides this indication. The home agent receives and processes the request, then forwards an appropriate reply (800) back to the mobile device.

21 Claims, 6 Drawing Sheets

METHOD AND APPARATUS FOR A MOBILE DEVICE TO ADDRESS A PRIVATE HOME AGENT HAVING A PUBLIC ADDRESS AND A PRIVATE ADDRESS

BACKGROUND OF THE INVENTION

1. Field of the Invention

The present invention relates generally to Mobile Internet Protocol (MIP), and more specifically to providing IP connectivity for roaming mobile IP devices belonging to a private network.

2. Discussion of the Related Art

Mobile Internet Protocol (MIP) provides the ability to maintain IP connectivity as a mobile IP device or Mobile Node (MN) changes its network connectivity points. The basic MIP operation relies on a MIP Home Agent (HA), a MIP client residing within the MN and optionally a MIP Foreign Agent (FA). The Home Agent resides on a Home Network, i.e., on the network that is topologically consistent with the address assigned to the MN. The FA resides in a network that the MN may roam into.

When the MN roams into a new network it will try to locate a FA. If an FA is present, the MN registers with the HA using the FA as a Care-of Address (COA). On successful registration, a tunnel is set up between the HA and FA. If an FA is not present in the roamed network, the MN acquires a local address (through dynamic host configuration protocol (DHCP), for example) and registers directly with the HA using the local address as the Care-of address. On successful registration, a tunnel is set up between the HA and the MN. Once registered, packets destined to the MN are intercepted by the Home Agent and tunneled to the MN. Packets from the MN to a correspondent node (CN) may be tunneled to the Home Agent or sent directly to the CN depending on whether reverse tunneling is activated or not.

The MIP operation described thus far assumes that the MN is able to register with the Home Agent when it is in a Roamed Network. The registration packet is an IP packet with the destination address being the Home Agent's IP address. A successful registration requires that the registration packet be routable to the Home Agent. However, a problem occurs when the Home Agent is located in a private network in which all IP addresses are private addresses. In other words, IP packets cannot be routed to these private addresses from outside the private network. In such a scenario, when the MN is in the same private network, the registration packet may be easily routed to the private Home Agent. However, when the MN has roamed outside of the private network into a public network, the registration packet is not routable to the private Home Agent. For example, a private cellular network supporting MIP, such as code division multiple access (CDMA 1x) systems or iDEN networks, maybe configured such that the Home Agent has a private address within the private cellular network and the MN roams into a public network outside of the private network, such as a wireless local area network (WLAN) or "hotspot". In this situation, the MN is unable to register with the Home Agent since it is in the private network and Mobile IP service outside of the private network is effectively eliminated.

One solution to this problem uses an MIP proxy device in the path between the MN outside of the private network and the Home Agent within the private network. Such an MIP proxy device is located in a separate policy control region (also sometimes referred to in the art as a demilitarized zone (DMZ)) between an edge router and a private firewall of the private network. The MIP proxy device serves as a surrogate MN and as a surrogate Home Agent to essentially stitch an end-to-end connection between the MN and its actual Home Agent. When the MN registers from the public network, it sends its registration packet to the MIP proxy device, not its Home Agent. This solution requires an additional device for MIP operation, i.e., the MIP proxy device. Furthermore, multiple MIP tunnels have to be established between the MN and the HA, i.e., the MIP tunnel between the MN and the MIP proxy device and the MIP tunnel between the MIP proxy device and the HA. Additionally, this solution also requires a change in MIP operation when the MN in within the private network since it will still register with the MIP proxy, i.e., when the MN is in the private network, it addresses the registration request to the MIP proxy device.

SUMMARY OF THE INVENTION

According to several embodiments of the invention, a solution is provided to allow a mobile communication device that belongs to a private network to register with its home agent (which also belongs to the private network) to register with the home agent once it has roamed into a public network. All network addresses (e.g., IP addresses) in the private network are private and not addressable to entities outside of the private network.

Thus, in a broad sense, one embodiment of the invention maybe characterized as a method for a mobile device to register with a private home agent comprising the steps of: generating a registration request addressed in the public network to a public address of a private home agent, the registration request adapted to initiate registration of the mobile device with the private home agent, the mobile device located within a public network, the mobile device belonging to a private network and having a private address, the private home agent located in the private network and having a private address and a public address; and sending the registration request to the public address of the private home agent, wherein the registration request indicates that the mobile device is in the public network.

In another embodiment the invention may be characterized as a method for a mobile device to register with a private home agent comprising the steps of: receiving a registration request adapted to initiate registration of a mobile device located within a public network with the private home agent, the mobile device belonging to a private network and having a private address, the private home agent located in the private network and having a private address and a public address, wherein the registration request is addressed in the public network to the public address of the private home agent, wherein the registration request indicates that the mobile device is in the public network; and processing the registration request.

Advantageously, according to several embodiments of the invention, the mobile device is able to maintain IP connectivity when the mobile device roams from the private network to the public network. Additionally, according to several embodiments, the solution does not rely on the use of an MIP proxy device according to a known solution. Additionally, modifications to the standard MIP registration operation preferably only occur when the mobile device has roamed into the public network. That is, the MIP operation is same when the mobile device is attempting to register with the private home agent from within the private network.

BRIEF DESCRIPTION OF THE DRAWINGS

The above and other aspects, features and advantages of the present invention will be more apparent from the following more particular description thereof, presented in conjunction with the following drawings.

Corresponding reference characters indicate corresponding components throughout the several views of the drawings.

DETAILED DESCRIPTION

The following description is not to be taken in a limiting sense, but is made merely for the purpose of describing the general principles of the preferred embodiments. The scope of the invention should be determined with reference to the claims.

Figure 1:
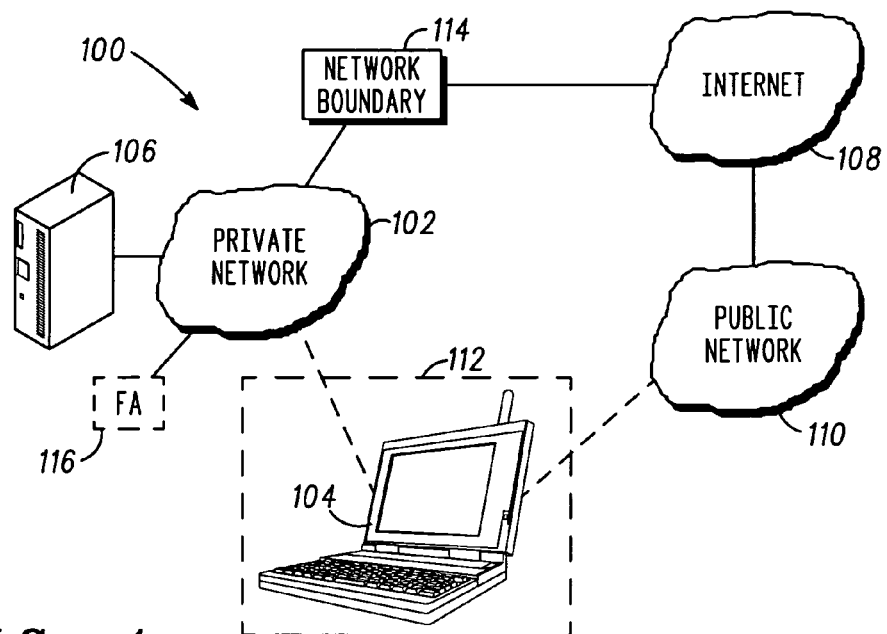
FIG. 1 is a diagram of a communication system in which a private mobile communication device within a public network registers with a private home agent within a private network according to several embodiments of the invention, a care-of node being the private mobile communication device.

Referring first to FIG. 1, a diagram of a communication system 100 is shown in which a private mobile communication device 104 roaming into a public network 110 registers with a private home agent 106 within a private network 102 according to several embodiments of the invention, a care-of node 112 being defined in this embodiment as the private mobile communication device. Illustrated is the system 100 including an Internet (or other extranet as may correspond to a given embodiment) 108, the public network 110, the private network 102, and a network boundary device 114 forming a boundary between the private network 102 and the outside public networks, i.e., the Internet 108 and public network 110. Also illustrated are the mobile device 104 (also referred to as a mobile node (MN)), a home agent (HA) 106, and an optional foreign agent (FA) 116 within the private network.

According to Mobile Internet Protocol (MIP), as the mobile device 104 changes physical locations, it is desired to maintain IP connectivity. The mobile device 104 may be any network addressable device that is mobile and is capable of joining a network. For example, the mobile device 104 may be a laptop or notebook computer, personal data assistant (PDA), telephone, appliance, etc. The mobile device may be generally referred to as a network addressable device and includes a client (i.e., client program or software) that provides the functionality to provide and maintain IP connectivity. For example, the MIP client of the mobile device is a set of instructions or software that is stored in memory within the mobile device and is executed by a processor.

When the mobile device 104 is in the private network and wants to communicate with a correspondent node (CN), for example, a server or website within the Internet 108, the client of the mobile device 104 registers with the home agent 106 directly or via the foreign agent 116 if present. However, as illustrated in FIG. 1, in the situation where the home agent 106 is located within the private network having a private address and the mobile device 104 roams outside of the private network 102 into a public network 110 (such as a wireless local area network or hotspot), according to the known MIP operation, the mobile device 104 can not register with the home agent 106. This is due to the fact that all of the devices within the private network 102 have private IP addresses that are not addressable from outside of the private network 102. One example of such a private network 102 is a private cellular network, such as a CMDA 1x and iDEN cellular network that supports MIP operation. Under normal operation, the mobile devices 104 remain within the private network 102, with all traffic to and from the mobile device 104 and the outside networks (i.e., the internet 108 and the public network 110) generally occurring via the private home agent 106.

Therefore, according to several embodiments of the invention, a solution is provided to allow the mobile device 104 to register with the private home agent 106 when the mobile device 104 has roamed outside of the private network 102 into a public network 110, when both the mobile device 104 and the home agent 106 have private network addresses.

In one embodiment, the private home agent 106 is configured to have two separate network addresses: a private network address and a public network address. When the mobile device 104 is within the private network 102, the mobile device sends a registration request (RRQ) addressed to the private network address of the home agent 106 according to known MIP operation. However, when the mobile device 104 has roamed outside of the private network 102 and seeks to register with the home agent 106, the mobile device sends an enhanced registration request (RRQ) addressed to the public network address of the home agent 106. The enhanced RRQ will be received at the network boundary device 114 of the private network 102, the network boundary device 114 processes the enhanced RRQ by performing a network address translation (NAT) on the header converting the home agent public address to the home agent private address and then routes the enhanced RRQ to the home agent at its private address.

Once received at the home agent 106, the RRQ is processed such that the enhanced RRQ indicates that the mobile device 104 is located outside of the private network. In preferred form, the enhanced registration request comprises a standard registration request according to the MIP operation with an extension, the extension indicating to the home agent 106 that the mobile device 104 is outside of the private network. The home agent 106 replies with a registration reply (RRLY) addressed back to the mobile device 104 in order to complete the registration. In preferred form, the registration request includes the public address of the private home agent in the registration request and that address is copied into the registration reply, instead of the private address of the home agent 106, which is described further below. Once registered, traffic flow between the mobile device 104 and a correspondent node (e.g., a node within the Internet 108) passes therebetween via the private home agent 106.

Advantageously, such a system allows for the mobile device 104 to register with the home agent 106 without creating an additional component, such as a MIP proxy device provided in other known solutions. Furthermore, when the mobile device 104 is within the private network 102, the standard MIP registration operation is unaltered, i.e., the mobile device sends registration requests directly to the private address of the private home agent, not to a proxy device, such as proposed in a known solution.

Modifications to the existing MIP operation in order to implement several embodiments of the invention include that the home agent 106 have two network addresses (i.e., a private address and a public address). This is in contrast to the solution utilizing the MIP proxy device, in which case the home agent has only one address—the private address. Furthermore, the client in the mobile device 104 is modified to support the two addresses for the home agent 106 and send an enhanced registration request when the mobile device is within a public network 110. The registration request is addressed to the home agent 106, not to a proxy device according to one known solution. The network boundary device 114 at the boundary between the private network 102 and the outside public networks processes the request by providing a network address translation from the public home agent address to the private home agent address. Also, the home agent 106 will be configured to process the enhanced registration request and respond appropriately.

It is noted that while MIP operation is specific to maintaining network connectivity for Internet Protocol version 4 (IPv4), the techniques provided herein apply to any system in which both a mobile device and a home agent device or similar controller belong to a private network and have private network addresses that are not addressable to entities outside of the private network 106, and where the mobile device is capable of roaming outside of the private network. In such systems, whether the mobile device 104 is within the private network or has roamed outside of the private network, the mobile device must register with the private home agent 106. For example, several embodiments of the invention may be applicable in IPv6 or any other data transfer protocol between addressable devices forming a network. It is noted that while many of the terms used throughout this specification are terms specific to IPv4 and MIP, such terms are by way of example, and it is intended that components functioning similarly to the described components are covered by one or more embodiments of the invention.

It is further noted that in the embodiment of FIG. 1, the client of the mobile device 104 includes foreign agent functionality such that the mobile device 104 may be generically referred to as a Care-of node 112 having a care-of address. This care-of address is likely assigned to the mobile device 104 by the public network 110, for example, through DHCP. As is described further with respect to FIG. 2, the public network may include a foreign agent, which may provide some of the functionality of the MIP client in allowing the mobile device to register with the home agent.

It is also noted that the mobile devices 104 described herein are preferably wireless devices in that they may connect wirelessly to the private and/or public network; however, in other embodiments, the mobile devices are wireline devices that may be unplugged and plugged into the private and/or public networks at various locations.

Figure 2:
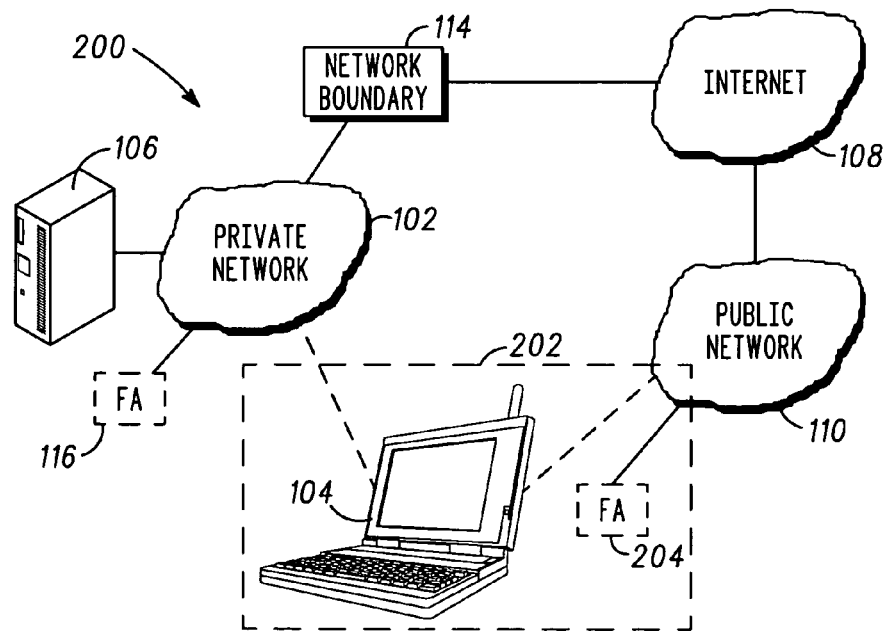
FIG. 2 is a variation of the system of FIG. 1 in which the public network includes a foreign agent of the private network according to another embodiment of the invention, the care-of node being the private mobile communication device and a foreign agent of the private network located within the public network.

Referring next to FIG. 2, a variation of the system of FIG. 1 is shown in which the public network 110 includes a foreign agent 204 of the private network 102 located within the public network according to another embodiment of the invention. In this system 200, the care-of node 202 is a combination of the private mobile device 104 and the foreign agent 204.

In this embodiment, the operator of the private network 102 has previously located the foreign agent 204 in the public network 110 to help facilitate communication with roaming devices that belong to the private network 102. Thus, some of the functionality of the MIP client that was located in the mobile device 104 in the system of FIG. 1 may reside within the foreign agent 204. In this embodiment, the mobile device 104 registers with the private home agent 106; however, does so via the foreign agent 204.

Thus, when the mobile device 104 roams into the public network 110, it tries to locate the foreign agent 204. The mobile device 104 uses the foreign agent 204 as a Care-of Address.

In this scenario, functionality to complete the registration may be implemented within the client of the mobile device 104, within both the mobile device 104 and the client of the foreign agent 204, or with foreign agent 204. Thus, the functionality performed by the client of the mobile device and the foreign agent may be varied. For example, in one embodiment, the client of the mobile device 104 functions exactly like that described in FIG. 1; however, uses the foreign agent 204 to relay the registration request to the home agent 106. That is, the mobile device 104 generates the enhanced registration request and sends it to the foreign agent 204 for forwarding to the home agent 106. In another embodiment, the mobile device attempts to register by sending a regular registration request addressed to the private address of the home agent 106, while the foreign agent 204 adds an enhancement (e.g., an extension to the RRQ) that indicates that the mobile device is in the public network.

The foreign agent 204 may also alter the registration request by changing the private address of the home agent, which is located in an address field of the registration request, to the public address of the private home agent 106. In another embodiment, the mobile device 104 generates an extension to the standard registration request, while the foreign agent 204 alters the home agent private address in the request to the public address. Accordingly, there may be many different embodiments variously distributing the functionality of the MIP client between the mobile device 104 and the foreign agent 204. Once the registration is complete, all data traffic to and from the mobile device 104 passes via the foreign agent 204.

In the systems of FIGS. 1 and 2, generically, the mobile device 104 forms a portion of a care-of node 112 or 202 whose public address becomes the care-of address for the mobile device 104 when it has roamed into the public network 110. The modifications to the MIP operation to allow for the mobile device to register with the private home agent 106 are generally made to the client functionality of the care-of node 112/202, whether the care-of node is defined as the mobile device 104 or the combination of the mobile device 104 and the foreign agent 204.

Figure 3:
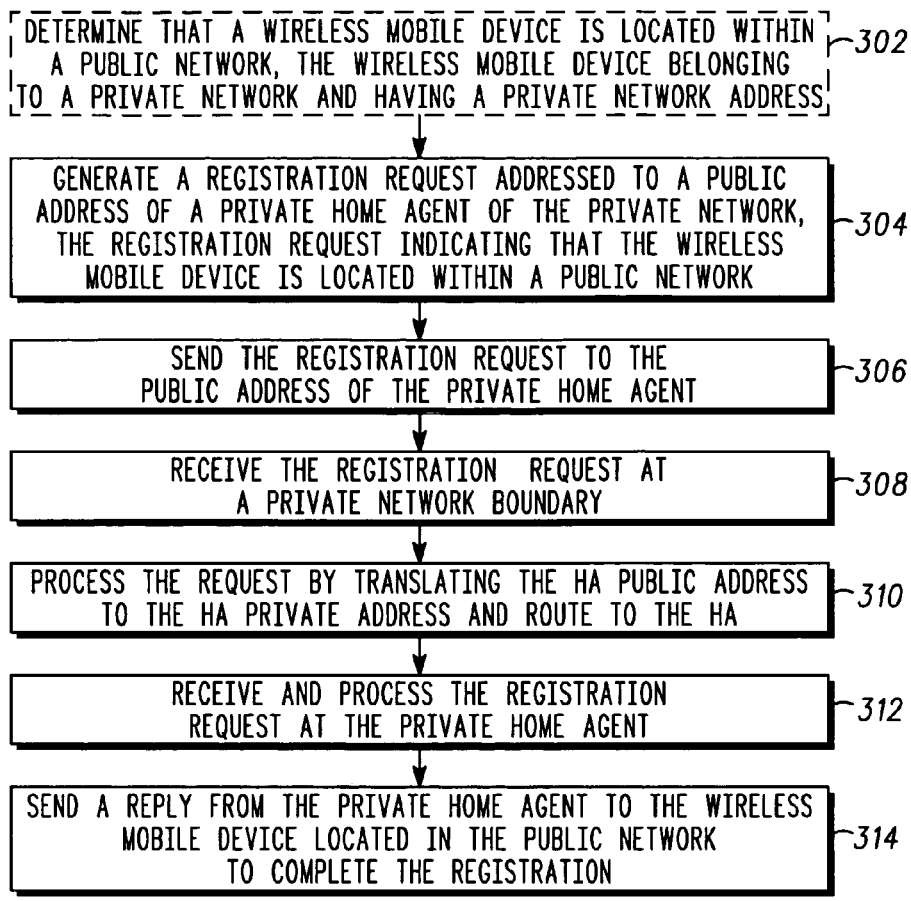
FIG. 3 is a flowchart of the steps performed in the registration of the private mobile communication device in the public network with the private home agent in the private network according to one embodiment of the invention.

Referring next to FIG. 3, a flowchart is shown of the steps performed in the registration of the private mobile device in the public network with the private home agent in the private network according to one embodiment of the invention. For example, one or more of the entities illustrated in FIGS. 1 and 2 may perform one or more of the steps illustrated in FIG. 3.

Initially, an optional step is to determine that the mobile device 104 is located within a public network 110, where the mobile device belongs to a private network 102 and has a private network address (Step 302). In one embodiment, this determination is made by the client of the mobile device when it attempts to join the public network 110. For example, the public network will assign the mobile device a network address. If the range of private addresses does not overlap the range of addresses in the public addresses, then the mobile device can easily tell that it is located outside of the private network. However, in cases where the private address and public address ranges overlap, the mobile device should use another mechanisms to detect its location in the public network 110.

In another embodiment, depending on what type of network the private network 102 and the public network 110 are, the mobile device may be able to make the determination based on the communication interface used. For example, where the private network is private cellular network and the public network is a wireless LAN, simply by determining which interface (i.e., the cellular interface or the WLAN interface) the mobile device is using when joining the network, the mobile device can determine which network it is in.

Step 302 is optional. For example, in some embodiments, an initial determining step is not performed. That is, the mobile device 104 sends out two different registration requests, one addressed to the private address of the home agent (as if the mobile device were located in the private network) and one addressed to the public address of the home agent (as if the mobile device were located in the public network). The mobile device will know which network it is located in by the registration reply received back from the home agent. Thus, in this embodiment, a distinct determination step is not performed.

Next (or initially depending on the embodiment), according to several embodiments of the invention, a registration request, which is addressed to a public address of the home agent is generated, the home agent being located within a private network and the registration request configured to indicate that the mobile device is located within a public network (Step 304). The home agent is configured to have two addresses—a public address and a private address. The header of the registration request is addressed to the home agent public address. In preferred form, the registration request is a standard registration request with an extension, the extension indicating that the mobile device is within the public network. Additionally, the source address field of the header of the registration request indicates a public address.

Next, the registration request is sent to the public address of the private home agent (Step 306). In one embodiment, the registration request is generated by and sent by the client of the mobile device 104 (via a foreign agent 204, if present). Alternatively, the mobile device client generates the registration request and the foreign agent adds an extension or other indication that the mobile device is outside of the private network. Furthermore, in another embodiment, the client of the mobile device sends a regular registration request addressed to the private address of the home agent as if the mobile device were within the private network and the foreign agent re-addresses the request to the public address of the home agent and adds an indication (e.g., an extension) that the mobile device is located outside of the private network. Thus, the foreign agent sends the registration request addressed to the public address of the home agent on behalf of the mobile device. It is noted that generically, the enhanced registration request is sent from a care-of node 112/202, the care-of node having a care-of address and defined as, for example, the mobile device 104 or the combination of the mobile device 104 and the foreign agent 204.

Next, the registration request is received at the private network boundary (Step 308). In the embodiments of FIGS. 1 and 2, this request is received at the network boundary device 114, which minimally functions as an edge router that performs network address translation and optionally functions as a firewall. Next, the public address of the private home agent is translated to the private address of the home agent and the registration request is routed to the home agent at its private address, i.e., the network translation device processes the registration request (Step 310). Thus, all packets addressed to the public address of the home agent 106 will be received at the network boundary device 114 and the destination address is translated to the private network address and routed thereto.

Next, the registration request is received and processed at the home agent 106 located within the private network 102 and processed (Step 312). From the home agent's perspective, the registration request appears as though it originated from within the private network 106 since it is routed to the private address of the home agent 106 (i.e., the network boundary device 114 translates the public destination address to the private address of the home agent). However, the contents of the registration request indicate to the home agent that the particular mobile device 104 has roamed outside of the private network 106 into a public network 110. Thus, although the home agent is configured to have two addresses, from the perspective of the home agent, it only has one true address (i.e., the private address). The home agent public address is an address supported by the operator of the private network which corresponds to the home agent private address. For example, the network boundary device 114 performs the translation between public and private address for the home agent.

In response, a reply from the home agent that is addressed to the public care-of address of the mobile device is sent to the mobile device (Step 314) in order to complete the registration. In one embodiment, rather than copying the home agent private address into the home agent address field of the registration reply, when the home agent decodes the extension to determine that the mobile device is in the public network, the home agent copies the public address located within the home agent address field of the registration request into the registration reply.

Again, it is noted that the destination address for the reply is a public care-of address from a care-of node 112/202. For example, in one form, the destination address is the public address of the mobile device assigned by the public network. In another form, the destination address is the public address of the foreign agent, which will forward the reply to the mobile device.

Figure 4:
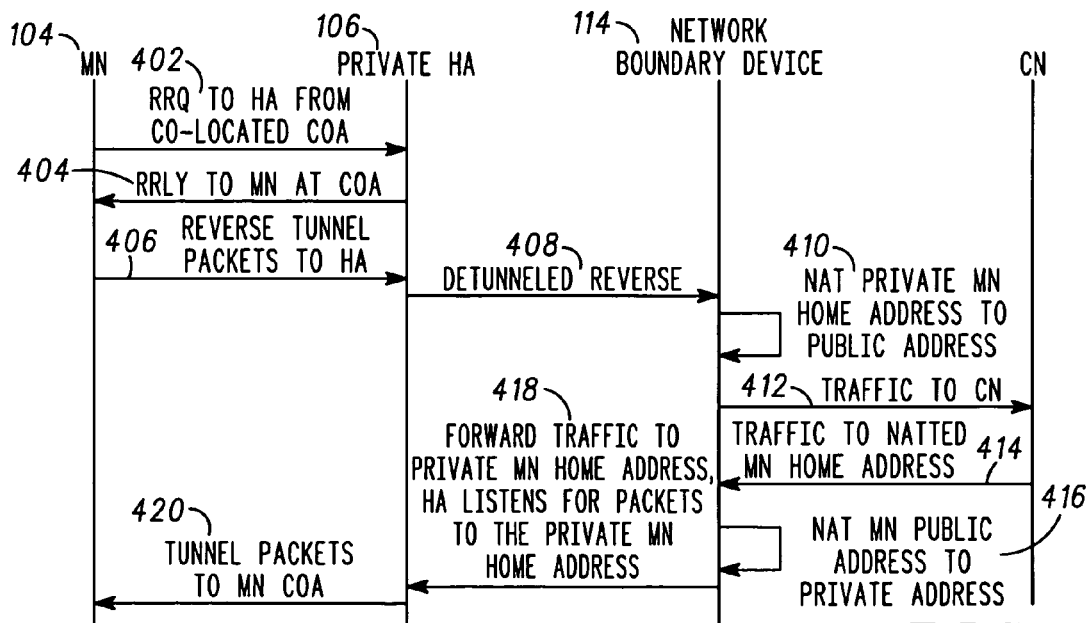
FIG. 4 is a signaling flow diagram for mobile registration of FIGS. 1–3 when the private mobile communication device is located within the private network along with the private home agent according to one embodiment.

The following is a more detailed description of the registration process according to several embodiments of the invention. Referring first to FIG. 4, a signaling flow diagram is shown for mobile registration when the private mobile communication device is located within the private network along with the private home agent according to one embodiment.

In this embodiment, the mobile device 104 labeled as the mobile node (MN) and the home agent (HA) 106 belong to a private network 102 and have private network addresses. The home agent also has a public address to support mobile registration from outside of the private network. In the diagram of FIG. 4, the mobile device is located in the private network and registers with home agent according to standard MIP operation.

The mobile device generates and sends a registration request (RRQ) addressed to the private address of the home agent (Step 402), the registration request being sent from a care-of address (COA) obtained by the mobile device. The COA is co-located with the mobile device's private address, i.e., the COA is also a private address. That is, the RRQ may be sent directly from the mobile device 104 to the home agent 106 or via a foreign agent 116 if present. Furthermore, a home agent address field of the registration request includes the private address of the home agent.

In response, the home agent sends a registration reply (RRLY) to the co-located care-of address (Step 404). The home agent copies its private address into a home agent address field of the registration reply. Once the client at the mobile device receives the registration reply and verifies that the address in the home agent address field of the reply matches the home agent address field of the request, the registration is complete.

Once registered, the mobile device starts an IP session and reverse tunnels packets to the home agent (Step 406). The home agent 106 then detunnels the packets received from the mobile device and sends them to a network boundary device (e.g., an edge router/optional firewall) (Step 408). The source address in the detunneled packets is the mobile device address, which is a private address. Next, the network boundary device 114 performs a network address translation (NAT) to translate the mobile private address to a public address assigned to the mobile device (Step 410). The network boundary device 114 may use static or dynamic NAT tables to perform this translation. The reverse traffic or packets are then forwarded to the correspondent node (CN) (Step 412). The CN is an entity that the mobile device seeks to communicate with, e.g., a web server within the Internet 108 hosting a web site.

The CN replies with forward traffic or packets to the public home address of the mobile device (Step 414). Again, the public home address of the mobile device 104 was created for the session by the network boundary device 114. Next, the network boundary device 114 performs a network address translation of the public mobile device home address to the private address of the mobile device (Step 416), i.e., the network boundary device NATs the public address of the mobile device back to its private address. The network boundary device 114 then forwards the packets to the private home agent 106, which listens for packets destined for the mobile device private address (Step 418). The home agent 106 then tunnels the packets from the correspondent node (CN) to the mobile device 104 (Step 420).

It is noted that the signaling flow diagram of FIG. 4 illustrates the MIP operation when the mobile device 104 and the home agent 106 belong to the private network 102 and the mobile device 104 is located within the private network 102. This procedure is generally known to those in the art. However, as mentioned, above, the problem arises when the mobile device 104 roams into a public network 110, i.e., it can not register with the home agent 106 since its registration packet is not routable to the home agent. Accordingly, several embodiments of the invention provide a solution to this situation. Next, a more detailed description is provided of MIP operation when the mobile device roams into a public network 110.

It is also noted that the solutions provided herein do not require a change in MIP operation when the mobile device is located within the private network 102, in contrast to known solutions using an MIP proxy device. Thus, in the known solution using the MIP proxy device, MIP operation is altered from the standard procedure when the mobile device registers from within the private network and from within a public network. Thus, advantageously according to several embodiments, the standard MIP operation illustrated in FIG. 4 is used when the mobile device is located within the private network.

Figure 5:
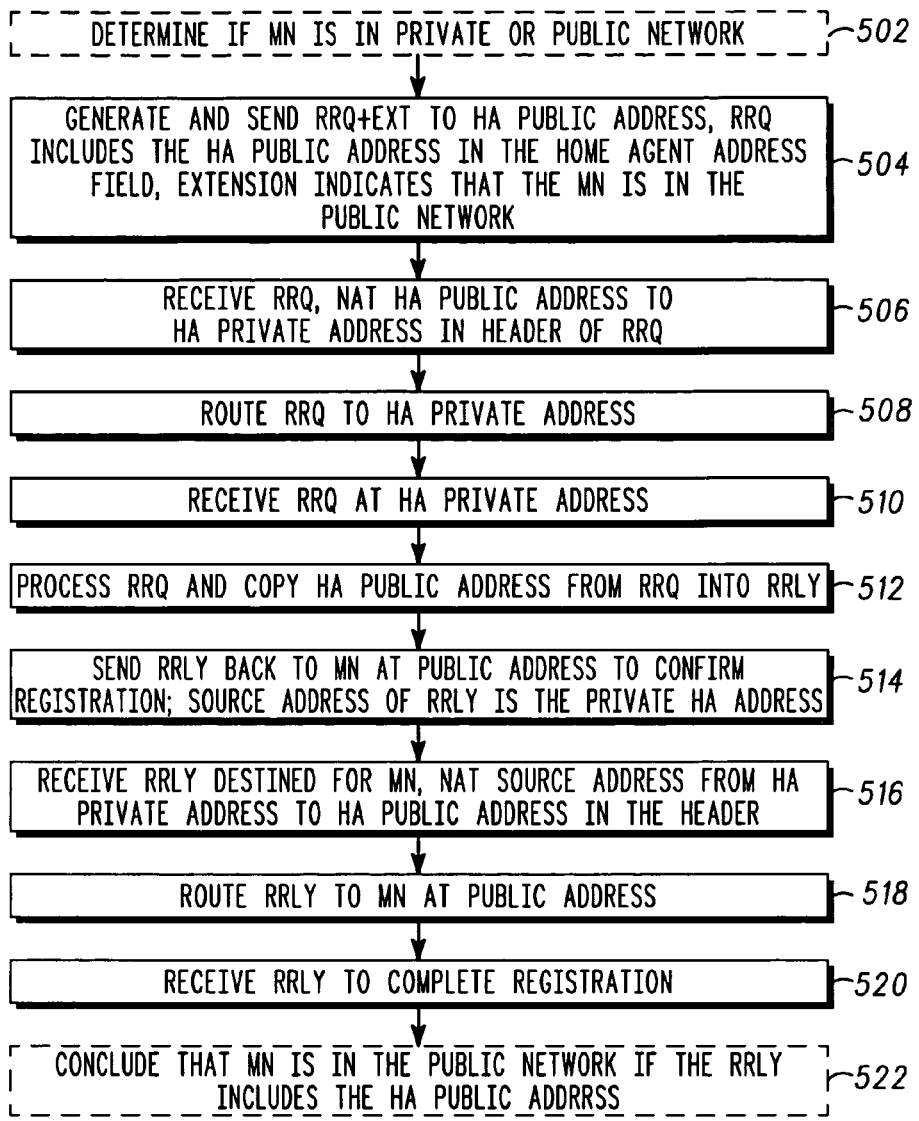
FIG. 5 is a flowchart of the steps performed in one embodiment of the mobile registration of FIGS. 1–3 when the private mobile device has roamed into a public network.
Figure 6:
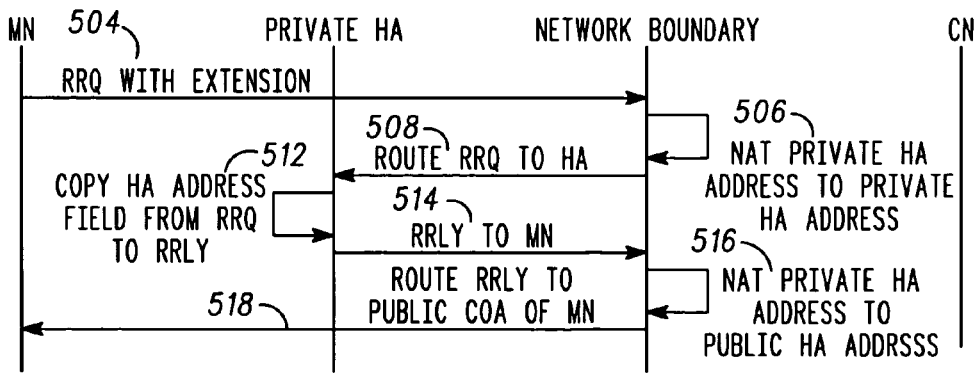
FIG. 6 is a signaling flow diagram for one embodiment of the mobile registration corresponding to the flowchart of FIG. 5.

Referring next to FIGS. 5 and 6, a flowchart, and a corresponding signaling flow diagram, are shown of the steps performed in one embodiment of the mobile registration of FIGS. 1–3 when the private mobile device has roamed into a public network. As described above, the mobile device 104 and the home agent (HA) 106 belong to the private network 102 and have private network addresses. The home agent also has a public address to support mobile registration from outside of the private network within the public network 110.

Optionally, an initial step determines if the mobile device is in the private network or in a public network (Step 502), such as described above, e.g., by determining which port the mobile device. Next (or initially depending on the embodiment), in order to register with the home agent 106, a registration request (RRQ) including an extension is generated that is addressed in the public network to the public address of the home agent and sent or routed to the public address of the home agent (Step 504). The public address of the home agent is included in a home agent address field of the registration request and the registration request is configured to indicate to the home agent that the mobile device is within the public network.

Figure 7:
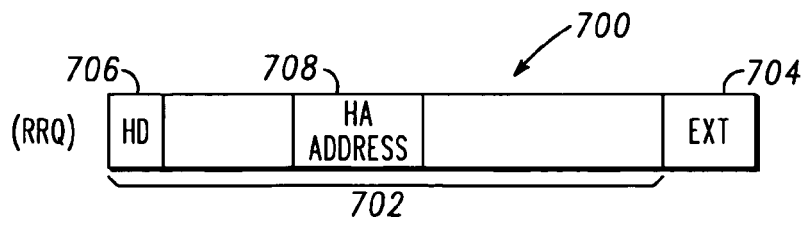
FIG. 7 depicts a registration request (RRQ) sent from or on behalf of the private mobile communication device of FIGS. 1 and 2 according to one embodiment of the invention.
Figure 12:
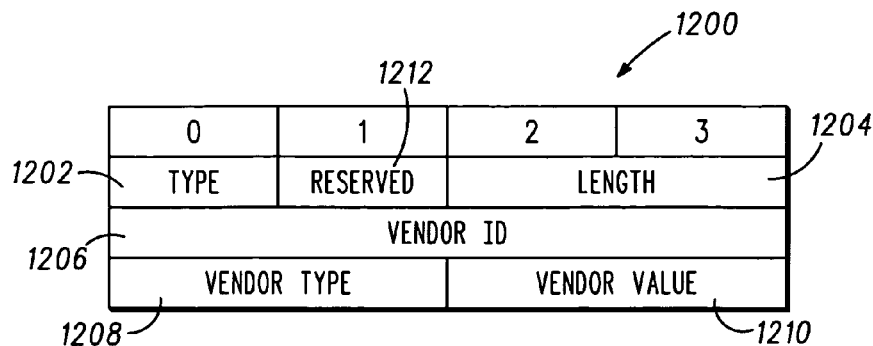
FIG. 12 is one embodiment of an extension to a registration request, such as illustrated in FIG. 7, the extension indicating that the private mobile communication device is located within a public network.

Briefly referring to FIG. 7, a simplified registration request packet 700 is illustrated. The packet 700 includes a standard portion 702 and an extension 704. The standard portion 702 includes a header 706 and a home agent address field 708. As is known in the art, there may be other fields in the standard portion 702. The header 706 is addressed to the public address of the home agent. It is noted that the source field of the header 706 is the public address of the mobile device, e.g., a public care-of address. Additionally, the home agent address field 708 includes the public address of the home agent. In contrast, according to standard MIP operation, the header 706 would be addressed to and the home agent address field 708 would include the private address of the home agent 106. However, as indicated above, when the mobile device 104 is outside of the private network 102, such a registration request is not routable to the home agent. Thus, according to several embodiments, when the mobile device is in the public network 110, the generated registration request 700 is addressed to the public address of the home agent. The extension 704 is provided to indicate to the home agent 106 that the mobile device is outside of the private network. One example of an extension is illustrated in FIG. 12.

In the embodiment of FIG. 6, the registration request (RRQ) including the extension is generated and sent by the mobile device, labeled as the mobile node (MN). However, as described above, if present, a foreign agent may perform some of the functionality of the MIP client and minimally forward the registration request to the public address of the home agent (HA). For example, the foreign agent may add an appropriate extension, alter the request or simply route the request. Thus, the registration request is sent directly from the mobile device 112 or via a foreign agent 204 in the public network, i.e., the registration address is sent from a care-of node 112/202 in the public network, the source address being the public address of the care-of node.

Next, the registration request is received and processed at the network boundary device, e.g., the public address of the home agent in the header 706 is translated to the private address of the home agent (Step 506). The network boundary device 114 then routes the registration packet to the home agent (Step 508) where it is received at the home agent (Step 510). From the home agent's perspective, it appears as though the registration request arrived from an entity within the private network.

At the home agent 106, the registration request is processed and if the home agent can decode or recognize the extension 704, the home agent public address from the home agent address field 708 of the request 700 is copied into a registration reply (Step 512). The home agent is configured to process the extension 704 such that if it recognizes the extension, it knows that the mobile device attempting to register is located within a public network. If the home agent is not able to decode the extension 704 or does not recognize the extension 704, the home agent ignores the request 700 or sends a reply with an error code. Next, the registration reply (RRLY) addressed to the public address of the mobile device (i.e., the public care-of address of the foreign agent or assigned to the mobile device) is sent (Step 514). The source address in the header of the registration reply as sent from the home agent is the private address of the home agent.

Figure 8:
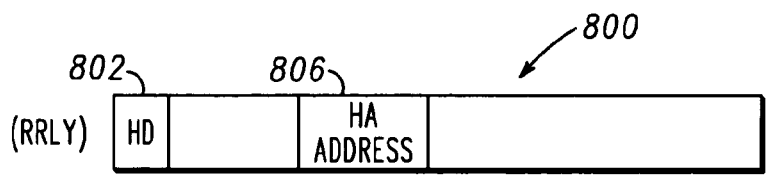
FIG. 8 depicts a registration reply (RRLY) generated by the private home agent and returned to the private mobile communication device according to one embodiment of the invention.

Briefly referring to FIG. 8, a simplified registration reply (RRLY) packet 800 is illustrated. The packet 800 includes a header 802 and a home agent address field 806. As is known in the art, there may be other fields in the reply. The header 802 includes the public care-of address for the mobile device as the destination address. The source address of the header 802 is the private address of the home agent, and the home agent address field 806 is the public address copied from the registration request. This is a departure from standard MIP operation, which the home agent 106 would copy its private address into the home agent address field 806 of the registration reply 800.

The registration reply is then received at the network boundary device 114 and processed such that the source address of the header 802 is translated to the public address of the home agent (Step 516). The reply 800 is then routed to the care-of address of the mobile device in the public network (either directly or via a foreign agent) (Step 518). The mobile device receives the registration reply (Step 520) and processes the reply per the MIP standard in order to complete registration. If the home agent 106 were to copy its private address into the home agent address field 806 per standard practice, the mobile device may discard the registration reply 800 since the home agent address field 806 in the reply 800 does not match the home agent address field 708 sent in the registration request 700.

Optionally, if the mobile device 104 is not aware that it is in the public network 110 or wishes to verify that it is in the public network, the mobile device can conclude that it is in the public network if the registration reply 800 contains the home agent public address in the home agent address field 806 (Step 522). This provides one way for the mobile device to determine that it is within the public network. For example, as described above, rather than specifically determining that the mobile device is in the public network, two different registration requests are sent (one addressed to the public address with an extension and the other addressed to the private address according to standard MIP operation). Depending on the address appearing in the home agent address field 806 of the reply 800, the mobile device can make the determination. For example, if the reply 800 includes the home agent private address in field 806, then the mobile device is located within the private network 102. On the other hand, if field 806 contains the home agent public address, the mobile device is within the public network 110. Once the mobile device 104 has successfully registered with the home agent, there is no change to the MIP operation for forward and reverse tunneled traffic, such as described below with reference to FIGS. 9–11.

Advantageously, according to several embodiments, a solution is provided that allows a private mobile device to register with a private home agent when the mobile device has roamed into a public network. In preferred embodiments, only minor changes to the standard MIP operation are needed. For example, the home agent 106 is configured to have two network addresses (i.e., a private address and a public address). Furthermore, the client in the mobile device 104 is modified to support the two addresses for the home agent 106 and send an enhanced registration request when the mobile device is within a public network 110. The network boundary device 114 at the boundary between the private network 102 and the outside public networks supports the two network addresses for the home agent and processes the registration request by providing a network address translation from the public home agent address to the private home agent address. Also, the home agent 106 is configured to process the enhanced registration request and respond appropriately when it decodes the extension.

In comparison to the known solution using a MIP proxy device, the additional entity (the MIP proxy) is not required, making this solution more efficient. The presence of the MIP proxy device requires additional tunnels to be set up between the MIP proxy and the home agent and between the MIP proxy and the network boundary device. Furthermore, the solution according to several embodiments does not require changes to the MIP operation when the mobile device registers from within the private network.

Figure 9:
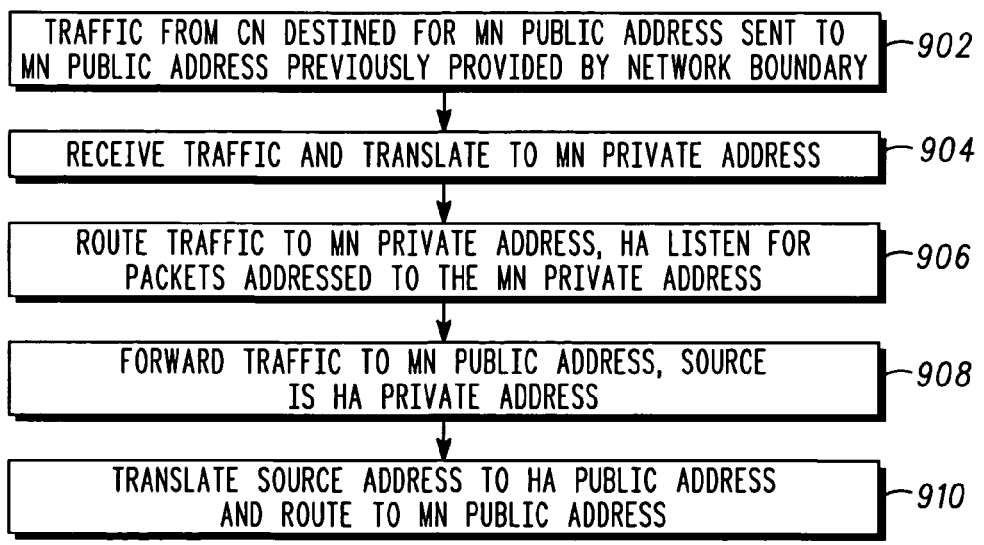
FIG. 9 is a flowchart of the steps performed for traffic flow from a correspondent node to the private mobile communication device once successfully registered with the home agent according to one embodiment.

Referring next to FIG. 9, a flowchart is shown of the steps performed for traffic flow from a correspondent node to the private mobile communication device once registered with the home agent according to one embodiment. Also, concurrent reference is made to FIG. 11, which is a corresponding signaling flow diagram of one embodiment of traffic once the private mobile communication device has registered with the home agent. As described above, the mobile device 104 and the home agent (HA) 106 belong to the private network 102 and have private network addresses. The home agent also has a public address to support mobile registration from outside of the private network within the public network 110.

Initially, forward traffic from the correspondent node (CN) destined for the mobile device 104 is routed to the translated mobile device public address previously provided by the network boundary device 114 (Step 902). This address is the public address assigned by the network boundary device and corresponds to the private address of the mobile device. Next, the traffic is received at the network boundary device 114, the mobile device public address being translated back to the private address of the mobile device (Step 904). Next, the forward traffic is routed to the private address of the mobile device and the home agent 106 listens for packets destined for the private address of the mobile device (Step 906). Next, the forward traffic is routed or tunneled to the public address (i.e., public care-of address) of the mobile device (Step 908), the source address being the home agent private address. Then, the network boundary device 114 translates the source address to the public address of the home agent and routes the forward traffic to the mobile device (Step 910). It is noted that from the perspective of the home agent 106, the home agent is configured to use its private address and to use the private address of the mobile device, while the network boundary device provides the necessary address translation between private and public addresses.

Figure 10:
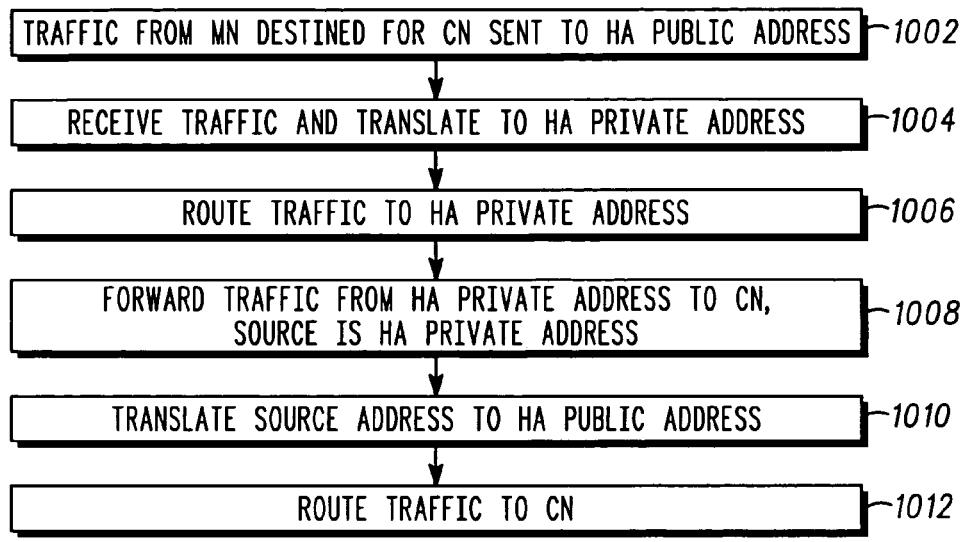
FIG. 10 is a flowchart of the steps performed for traffic flow from the private mobile communication device to the correspondent node once registered according to one embodiment to FIG. 8.

Referring next to FIG. 10, a flowchart is shown of the steps performed for traffic flow from the private mobile communication device to the correspondent node according to one embodiment to FIG. 8. Concurrent reference is also made to FIG. 11. Reverse traffic from the mobile device 104 destined for the correspondent node (CN) is sent to the public address of the home agent 106 (Step 1002), the source address being the public care-of address of the mobile device. The reverse traffic is received, e.g., at the network boundary device 114, and the home agent public address is translated to the home agent private address (Step 1004). The reverse traffic is then tunneled or routed to the home agent at its private address (Step 1006). Next, the home agent detunnels or routes the reverse traffic to the correspondent node (CN), the source address being the private address of the home agent (Step 1008). Next, the network boundary device 114 translates the source address from the home agent private address to the assigned home agent public address (Step 1010) and routes the traffic to the correspondent node (Step 1012).

Figure 11:
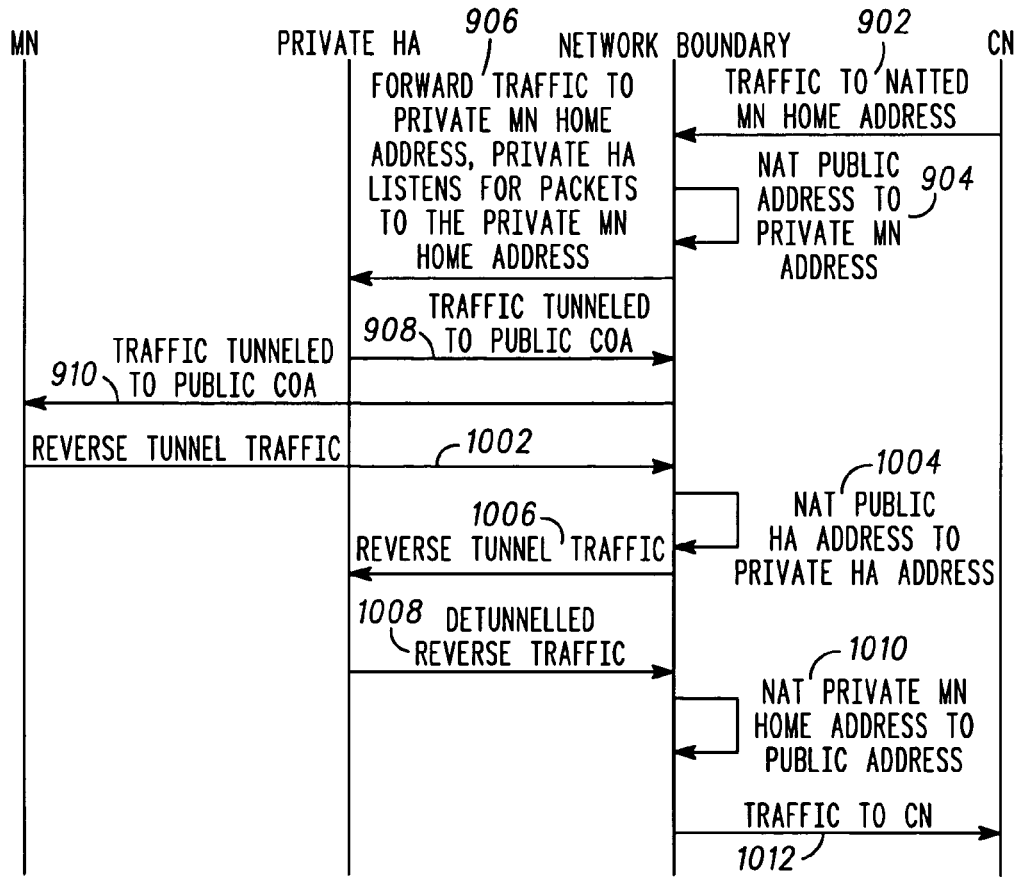
FIG. 11 is a signaling flow diagram of one embodiment of traffic once the private mobile communication device has registered corresponding to the flowcharts of FIGS. 9 and 10.

As illustrated in FIGS. 9–11, once the mobile device has successfully registered, the MIP operation is generally the same as the standard procedure. In contrast, known solutions using an MIP proxy device must continue to use the proxy device for communications. Such solution is inefficient since additional tunnels are required to be set up. For example, tunnels between the home agent 106 and the MIP proxy device and the between the MIP proxy device and the network boundary device 114.

Referring next to FIG. 12, one embodiment is shown of an extension to a registration request, such as illustrated in FIG. 7, the extension indicating that the private mobile communication device is located within a public network. In this embodiment, the extension 1200 is 12 bytes and includes a type field 1202 which generally indicates what type of extension, e.g., a private home agent extension. Also included is a length field 1204 to indicate the length of the extension 1200. A vendor identification field 1206 identifies the vendor, i.e., the operator of the private network. A vendor type field 1208 indicates the type of vendor and a vendor value field 1210 provides a value for the vendor. These fields 1208 and 1210 are arbitrary and chosen by the vendor. Also, a reserved field 1212 is provided as needed. It is noted that this is merely one of many possible examples of an extension. As described above, in preferred embodiments, the purpose of the extension is to signal to the home agent that is in the private network that the registering private device is located within a public network. Generally, the type field 1202 indicates to the home agent that the mobile device is within the public network. Once this is recognized, as described above, the home agent generates an appropriate registration reply to complete the registration, e.g., the home agent copies the address in the home agent address field 708 into the home agent address field 806 of the reply 800. Thus, the home agent is configured to process the extension.

Figure 13:
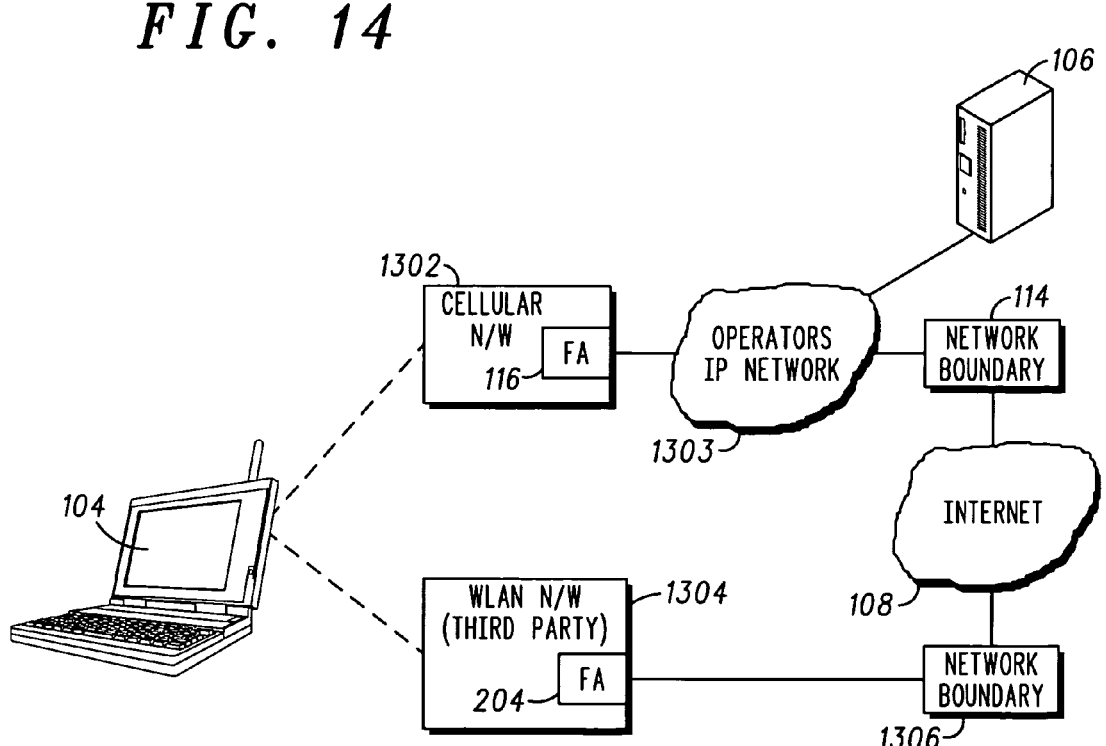
FIG. 13 is one embodiment of the system of FIG. 2 in which the private network is a cellular network and the public network is a wireless local area network.

Referring next to FIG. 13, one embodiment of the system of FIG. 2 is shown in which the private network includes a private cellular network 1302 and the operator's IP network 1303, while the public network is a wireless local area network (WLAN) 1304. In this embodiment, the MIP client of the private mobile device 104 registers with the private home agent 106 of the IP network 1303 via the foreign agent 116 when the mobile device is in the private cellular network 1302. When the mobile device roams into the wireless local area network, such as a hot spot, the mobile device 104 registers with the private home agent 106 via the foreign agent 204 within the wireless WLAN 1304. It is noted that the WLAN 1304 includes a network boundary 1306 (e.g., firewall) between itself and the Internet 108. Several embodiments of the invention advantageously provide a way for the mobile device to successfully register with the private home agent 106 when it is within the WLAN 1304 without affecting registration when the mobile device is in the private cellular network 1302.

Figure 14:
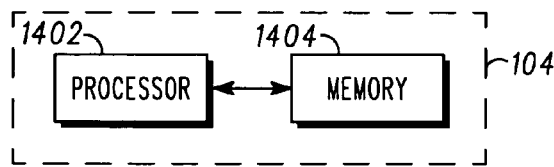
FIG. 14 is a simplified diagram of one embodiment of the Mobile IP client that functionally resides in the mobile device of FIG. 1.

Referring next to FIG. 14, a simplified diagram is shown for one embodiment of the MIP client that functionally resides in the mobile device 104. Illustrated is the mobile device 104 including a processor 1402 and a memory 1404. The MIP client as described herein is a set of instructions or software (e.g., for performing or causing to perform one or more steps such as described in FIGS. 3–6 and 9–11) that is stored in the memory 1404 and is executed by the processor 1402 or other machine. It is further noted that in the event that the MIP client functionally resides in part in the foreign agent 204, the foreign agent 204 will have a set of instructions stored in its memory to be run on a processor of the foreign agent. It is noted that many of the steps described in the various flowcharts and signaling diagrams herein, e.g., FIGS. 3–6 and 9–11 may be performed or caused to be performed by executing an appropriate set of instructions stored in memory of the appropriate device on a processor or other machine. Additionally, such instructions may be encoded in hardware and provide the same functionality.

It is noted that since the solutions provided herein provide the home agent 106 with a public address, the private home agent would be vulnerable to security threats via the public address. For example, two possible security risks include unauthorized access into the home agent via its public address and denial of service attacks via the public address.

In one approach addressing unauthorized access into the private home agent, the home agent could be configured to disable telnet, rlogin, ftp and other remote access into the private home agent. Another approach would be to only allow registration requests from well-known ports providing a restrictive public access. Another approach is to provide a virtual private network (VPN) server that all Mobile IP traffic must pass through. In this case, after the mobile device 104 registers with the home agent 106, the mobile device must establish a VPN session using its home address. Then, the mobile device would be able reverse tunnel traffic to the home agent only via the VPN server. Similarly, a CN must also establish a VPN session before accessing a mobile device.

Denial of Service attacks could be launched by flooding the home agent with spurious Mobile IP traffic. However enforcing the MIP traffic over VPN policy, can thwart this kind of MIP traffic attack. Denial of Service Attacks could be launched against the private home agent by flooding the home agent with Registration Requests. This would force the home agent to spend all its system resources on processing the registration requests. As of today, there are no satisfactory solutions that address this potential security threat.

While the invention herein disclosed has been described by means of specific embodiments and applications thereof, numerous modifications and variations could be made thereto by those skilled in the art without departing from the scope of the invention set forth in the claims.

What is claimed is:

1. A method for a mobile device to register with a private home agent comprising the steps of:
   assigning the private home agent a home agent private address and a public address wherein the home agent private address for use by the mobile device when the mobile device is in a private network and the public address for use by the mobile device when the mobile device is in a public network;
   generating a registration request addressed in the public network to the public address of the private home agent, wherein the registration request initiates registration of the mobile device with the private home agent when the mobile device is located within the public network, the mobile device belonging to a private network and having a mobile device private address; and
   sending the registration request to the public address of the private home agent, wherein the registration request indicates that the mobile device is in the public network.

2. The method of claim 1 wherein the generating step comprises:
   generating the registration request, the registration request comprises an extension, the extension indicating that the mobile device is in the public network.

3. The method of claim 1 wherein the sending step further comprises:
   sending the registration request from the mobile device.

4. The method of claim 1 wherein the sending step comprises:
   sending the registration request from a foreign agent located within the public network on behalf of the mobile device.

5. The method of claim 1 wherein the sending step comprises:
   sending the registration request from the mobile device, the registration request addressed to the home agent private address;
   receiving the registration request in the public network;
   altering the registration request to address the registration request to the public address of the private home agent; and
   sending the altered registration request addressed to the public address of the private home agent.

6. The method of claim 1 wherein the sending step comprises:
   sending the registration request from the mobile device, the registration request not indicating that the mobile device is located within the public network;
   receiving the registration request in the public network;
   altering the registration request to indicate that the mobile device is located within the public network; and
   sending the altered registration request addressed to the public address of the private home agent.

7. The method of claim 1 further comprising:
   determining that the mobile device is located within the public network.

8. The method of claim 7 wherein the determining step comprises:
   sending another registration request addressed to the home agent private address;
   receiving a registration reply from the private home agent;
   processing the registration reply to determine that the mobile device is located within the public network.

9. The method of claim 1 further comprising the steps of:
   receiving the registration request in the private network; and
   processing the registration request.

10. A method for a mobile device to register with a private home agent comprising the steps of:
    assigning the private home agent a home agent private address and a public address wherein the home agent private address for use by the mobile device when the mobile device is in a private network and the public address for use by the mobile device mobile device is in a public network;
    receiving a registration request wherein the registration request initiates registration of the mobile device when the mobile device is located within the public network with the private home agent, the mobile device belonging to a private network and having a private address, wherein the registration request is addressed in the public network to the public address of the private borne agent, wherein the registration request indicates that the mobile device is in the public network; and
    processing the registration request.

11. The method of claim 10 wherein the registration request comprises an extension, the extension indicating that the mobile device is in the public network.

12. The method of claim 10 wherein the receiving comprises:
    receiving the registration request at a network boundary device at a boundary of the private network,
    wherein the processing comprises:
    translating the public address of the private home agent to the home agent private address; and
    the method further comprising the step of:
    routing the registration request to the home agent private address.

13. The method of claim 10 wherein the receiving comprises:

receiving the registration request at the private home agent;
wherein the processing comprises:
decoding the registration request to determine that the mobile device is in the public network;
the method further comprising the steps of:
copying the public address of the private home agent into a registration reply; and
sending the registration reply to be routed to the mobile device.

14. The method of claim 13 wherein a home agent address field of the registration request comprises the public address of the private home agent, wherein the copying step comprises:
copying the public address from the home agent address field into a home agent address field of the registration reply.

15. A mobile device comprising:
a processor; and
a memory coupled to the processor, the memory comprising a set of instructions executable by the processor,
the set of instructions generating a registration request addressed to a public address of a private home agent, wherein the registration request initiates registration of the mobile device with the private home agent, the mobile device located within a public network, the mobile device belonging to a private network and having a mobile device private address, the private home agent located in the private network and having a home agent private address for use by the mobile device when the mobile device is in the private network and the public address for use by the mobile device when the mobile device is in the public network; and
the set of instructions sending of the registration request to the public address of the private home agent, wherein the registration request indicates that the mobile device is in the public network.

16. The device of claim 15 wherein the set of instructions generating the registration request, the registration request comprising an extension, the extension indicating that the mobile device is in the public network.

17. The device of claim 15 wherein the set of instructions is further determining that the mobile device is located within the public network.

18. A system comprising:
a care-of node comprising a mobile device, the care-of node located in a public network, the mobile device belonging to a private network and having a mobile device private network address;
a network boundary device at a boundary of the private network; and
a home agent located in the private network and having a home agent private address for use by the mobile device when the mobile device is in the private network and a public address for use by the mobile device when the mobile device is in the public network;
wherein the care-of node generates and sends a registration request addressed to the public address of the home agent, the registration request initiates registration of the mobile device with the home agent, wherein the registration request indicates that the mobile device is in the public network;
the network boundary device receives the registration request, translate the public address of the home agent to the home agent private address, and route the registration request to the home agent; and
the home agent processes the registration request to determine that the mobile device is located in the public network and generate a registration reply to be routed back to the mobile device.

19. The system of claim 18 wherein the care-of node comprises the mobile device having client functionality to cause the generation and sending of the registration request.

20. The system of claim 18 wherein the care-of node comprises:
a foreign agent that belongs to the private network and is located in the public network;
the foreign agent routes the registration request addressed to the public address of the home agent on behalf of the mobile device.

21. The system of claim 20 wherein client functionality to cause the generation and sending of the registration request is shared between the foreign agent and the mobile device.

* * * * *